United States Patent
Lujan et al.

(10) Patent No.: US 7,840,925 B1
(45) Date of Patent: Nov. 23, 2010

(54) SOURCE SPECIFIC TIMING CHECKS ON SYNCHRONOUS ELEMENTS USING A STATIC TIMING ANALYSIS ENGINE

(75) Inventors: Jaime D. Lujan, Louisville, CO (US); Mario Escobar, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 223 days.

(21) Appl. No.: 12/047,502

(22) Filed: Mar. 13, 2008

(51) Int. Cl.
*G06F 17/50* (2006.01)

(52) U.S. Cl. .............................................. 716/6; 716/1
(58) Field of Classification Search ...................... 716/1, 716/6
See application file for complete search history.

(56) References Cited

U.S. PATENT DOCUMENTS

| | | | |
|---|---|---|---|
| 5,517,658 A | 5/1996 | Gluss et al. | |
| 5,719,783 A * | 2/1998 | Kerzman et al. ................ | 716/6 |
| 6,480,817 B1 | 11/2002 | Peters et al. | |
| 6,487,701 B1 | 11/2002 | Dean et al. | |
| 6,557,150 B1 | 4/2003 | Honmura et al. | |
| 6,611,948 B1 | 8/2003 | Tyler et al. | |
| 6,857,110 B1 | 2/2005 | Rupp et al. | |
| 2006/0117286 A1 * | 6/2006 | Ando et al. ..................... | 716/6 |
| 2007/0089076 A1 * | 4/2007 | Amatangelo ..................... | 716/6 |
| 2008/0141198 A1 * | 6/2008 | Chen et al. ..................... | 716/6 |
| 2008/0291749 A1 * | 11/2008 | Kishimoto et al. ..... | 365/189.05 |
| 2009/0235133 A1 * | 9/2009 | Kapur et al. ................ | 714/726 |

OTHER PUBLICATIONS

Xilinx, Inc.; U.S. Appl. No. 11/333,863 by Campbell et al., filed Jan. 17, 2006.
Xilinx, Inc.; U.S. Appl. No. 11/433,127 by Campbell et al., filed May 12, 2006.

* cited by examiner

*Primary Examiner*—Jack Chiang
*Assistant Examiner*—Suchin Parihar
(74) *Attorney, Agent, or Firm*—Kevin T. Cuenot; LeRoy D. Maunu (57) ABSTRACT

A computer-implemented method of performing timing analysis upon a circuit design having synchronous circuit elements can include selecting a destination pin having a plurality of source pins, wherein each source pin of the plurality of source pins defines a data path to the destination pin. A slack of a selected path of the data paths to the destination pin can be determined. A timing adjustment of each of the plurality of source pins can be compared to the slack of the selected path, wherein each timing adjustment is determined using static timing analysis. A simulation node can be selectively included within the circuit design according to the comparison. The circuit design can be output.

20 Claims, 4 Drawing Sheets

SOURCE SPECIFIC TIMING CHECKS ON SYNCHRONOUS ELEMENTS USING A STATIC TIMING ANALYSIS ENGINE

FIELD OF THE INVENTION

The embodiments disclosed herein relate to integrated circuit devices (ICs). More particularly, the embodiments relate to timing analysis and simulation of digital circuit designs for implementation within ICs.

BACKGROUND

The increased speed of modern digital circuits requires highly accurate techniques for timing analysis so that the circuit designs can be adequately tested and verified. Timing analysis, in general, refers to the process of calculating signal arrival times at clock-controlled nodes of a circuit design to verify that the signal will arrive at each node within a specified time interval. For instance, for an edge triggered register, the signal must arrive at the register before the active edge of the clock. If the signal does not arrive within the specified timing interval, a violation occurs, potentially causing the circuit to malfunction.

Typically, timing analysis is performed using an Electronic Design Automation (EDA) tool. The EDA tool essentially analyzes a digital circuit, which can be expressed using a hardware description language (HDL), as well as a timing description of the digital circuit. In general, there are two different types of timing analysis that can be performed. One is called dynamic timing analysis and the other is called static timing analysis.

Within dynamic timing analysis, a delay annotation tool accesses a collection of fixed delays that model various timing parameters of the digital circuit. An example of a dynamic timing simulation program is the Xilinx® ISE Simulator, also known as "Isim," which is commercially available from Xilinx, Inc. of San Jose, Calif. Xilinx, ISE, and Isim are trademarks of Xilinx, Inc. in the United States, other countries, or both. In general, Isim is an HDL simulator capable of performing functional and timing simulations for VHDL and Verilog designs. Typically, timing information is specified within a Standard Delay Format (SDF) file as defined by Open Verilog International. Input vectors are provided to the circuit design under test.

The delays specified in the SDF file are fixed in that each represents a timing parameter of the digital circuit under a different set of physical circumstances relating to manufacturing process, temperature, voltage, etc. The fixed delays specified in the SDF file represent delays associated with different components of the digital circuit under what can be considered extreme operating conditions. While the delay information used for dynamic timing analysis covers a range of scenarios, it does not reflect variations in conditions that occur during normal operation of the digital circuit.

By comparison, static timing analysis performs more complex timing calculations and requires no input vectors. Static timing analysis can evaluate all possible paths of a digital circuit, and can indicate a worst case scenario in terms of the delay information that is created on a per signal path basis. As such, static timing analysis reflects the delay variations that may occur during normal operation of a digital circuit. Examples of these variations can include, but are not limited to, clock skew, clock uncertainty, or the like.

In general, static timing analysis involves two types of analysis. The first type of analysis, referred to as a "setup check," determines the maximum delay of a path to a synchronous circuit element. A setup check determines the latest time a data signal can arrive at the input port of a destination register before a timing violation, called a setup violation, occurs. The second type of static analysis, referred to as a "hold check," concerns determining a minimum delay of a path in the circuit design. A hold check determines whether a data signal at an input port of a given clocked circuit element is stable, e.g., remains constant, for a long enough time period. If not, a timing violation called a hold violation occurs.

In view of the differences between dynamic and static timing analysis, there often are differences between the results obtained using dynamic timing analysis and the results obtained using static timing analysis for the same digital circuit. For example, the timing information used in dynamic timing analysis may be overly optimistic with respect to the signal path delays used.

SUMMARY

The embodiments disclosed herein relate to timing analysis of digital circuit designs for implementation within integrated circuit devices. One embodiment of the present invention can include a computer-implemented method of performing timing analysis upon a circuit design including synchronous circuit elements. The method can include selecting a destination pin having a plurality of source pins, wherein each source pin of the plurality of source pins defines a data path to the destination pin. A slack of a selected data path of the data paths to the destination pin can be determined. A timing adjustment for each of the plurality of source pins can be compared to the slack of the selected data path. Each timing adjustment can be determined using static timing analysis. A simulation node can be selectively included within the circuit design according to the comparison. The simulation node can perform at least one of a setup check or a hold check. The circuit design comprising the simulation node can be output.

The computer-implemented method can include performing dynamic timing analysis upon the circuit design. An error signal can be output from the simulation node when a signal received by the simulation node from a given source pin is not received within a timing interval defined, at least in part, according to the timing adjustment of the given source pin. A destination register including the destination pin can be placed in an unknown state responsive to the error signal.

During dynamic timing analysis of the circuit design, the simulation node can determine whether a timing violation has occurred according to a timing interval that depends, at least in part, upon at least one timing adjustment. Responsive to determining that a timing violation has occurred, an indication of the source pin responsible for the timing violation can be output.

In one embodiment, the timing adjustments can be setup adjustments and the selected path can be a data path to the destination pin having a longest delay. In that case, comparing each timing adjustment with the slack can include determining whether the setup adjustment for each source pin exceeds the slack of the selected path.

Accordingly, selectively including the simulation node can include, for each source pin having a setup adjustment exceeding the slack: including, within the circuit design, a buffer receiving a signal from the source pin, wherein the delay of the buffer is equivalent to a maximum delay of the data path defined by the source pin, and including, within the circuit design, a check node receiving a signal output from the buffer. The check node can perform a setup check on the signal output from the buffer according to a timing interval defined, at least in part, by the setup adjustment for the path defined by the source pin. An output of the check node can be coupled with an error input of a destination circuit element including the destination pin.

In another embodiment, the timing adjustments can be hold adjustments and the selected path can be a data path to the destination pin having a shortest delay. In that case, comparing each timing adjustment with the slack can include determining whether the hold adjustment for each source pin exceeds the slack of the selected path.

Accordingly, selectively including a simulation node can include, for each source pin having a hold adjustment exceeding the slack: including, within the circuit design, a buffer receiving a signal from the source pin, wherein the delay of the buffer is equivalent to a minimum delay of the data path defined by the source pin, and including, within the circuit design, a check node receiving a signal output from the buffer. The check node can perform a hold check on the signal output from the buffer according to a timing interval defined, at least in part, by the hold adjustment for the path defined by the source pin. An output of the check node can be coupled to an error input of a destination circuit element including the destination pin.

In another embodiment, selectively including the simulation node can comprise including a plurality of check nodes and corresponding buffers and a logic gate. An output of each check node can be coupled to an input of the logic gate. The logic gate can generate an error signal responsive to detecting an error signal from any of the plurality of check nodes. The error signal from the logic gate can be coupled to an error input of a circuit element including the destination pin.

Another embodiment of the present invention can include a computer-implemented method of performing timing analysis upon a circuit design having synchronous circuit elements. The method can include selecting a destination pin receiving a plurality of data paths and determining a slack of a data path having a longest delay of the plurality of data paths and a slack of a data path having a shortest delay of the plurality of data paths.

A setup adjustment and a hold adjustment for each of the plurality of data paths can be calculated. The setup adjustment of each data path can be compared with the slack of the data path having the longest delay. The hold adjustment of each data path can be compared with the slack of the data path having the shortest delay. For each data path, the method can include selectively including, within the circuit design, a check node according to the comparisons of the setup adjustment for the data path and the hold adjustment for the data path. The circuit design comprising the check node can be output.

The computer-implemented method also can include determining the setup adjustments and the hold adjustments through static timing analysis, and performing dynamic timing analysis upon the circuit design. Each check node can compare signal timing according to a timing interval adjusted by at least one of the setup adjustment or the hold adjustment for the data path corresponding to the check node.

Yet another embodiment of the present invention can include a computer program product including a computer-usable medium having computer-usable program code that, when executed by an information processing system, causes the information processing system to perform the various steps and/or functions disclosed herein.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

The embodiments disclosed herein relate to timing analysis of a digital circuit design that is to be implemented within an integrated circuit device. Timing data for the circuit design can be calculated using static timing analysis. When particular timing conditions are met, one or more check node modules can be included in the circuit design. Each check node module can evaluate the timing of a data signal in terms of a defined timing interval that can be adjusted, or modified, based upon timing data calculated using static timing analysis.

The check node modules are operable during dynamic timing analysis, e.g., simulation, to perform setup and/or hold checks on data signals with respect to a defined timing interval. In this manner, the results determined from dynamic timing analysis of the circuit design will more closely track the results obtained from static timing analysis, since the timing interval is adjusted based upon static timing analysis results. Moreover, the check nodes can indicate which of a plurality of data paths leading to a same destination is the cause of a timing violation.

Figure 1:
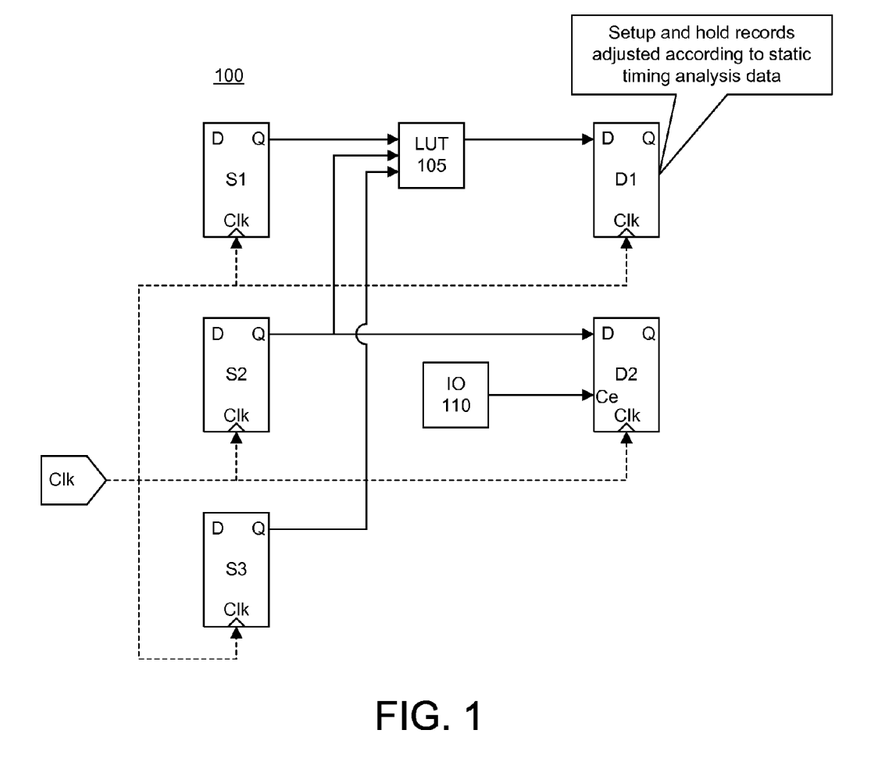
FIG. 1 is a first block diagram illustrating a circuit design in accordance with one embodiment of the present invention.

FIG. 1 is a first block diagram illustrating a circuit design 100 in accordance with one embodiment of the present invention. The circuit design 100 can be specified in any of a variety of programmatic formats, e.g., one or more hardware description language (HDL) files, a netlist, e.g., a simulation netlist, or the like. As shown, the circuit design 100 can include a plurality of source registers S1, S2, and S3, as well as a plurality of destination registers D1 and D2.

Each source and destination (which may be a register, as shown in FIG. 1, or some other synchronous circuit element) includes an input pin denoted as "D" and an output pin denoted as "Q." Within this specification, individual pins of each source or destination can be indicated by an expression including the name of the source or destination followed by the pin. For example, the D pin of source S1 can be indicated by the nomenclature S1.D. Building on this, a path between pin Q of source S1 to pin D of destination D1 can be indicated as S1.Q-D1.D. The same path may also be specified in more general terms as S1-D1. Further, within this specification, the same reference characters are used to refer to ports, pins, and their corresponding signals. Accordingly, the terms "signal," "port," "connection," "terminal," and "pin" may be used interchangeably, from time-to-time, within the present specification.

Each of the sources S1, S2, and S3, and destinations D1 and D2 can include a clock pin denoted as "Clk" that can receive a clock signal. Within circuit 100, each of sources S1, S2, S3, and destinations D1 and D2 can be clocked by a same clock signal. Each of output pins S1.Q, S2.Q, and S3.Q of sources S1, S2, and S3 can be coupled to an input pin of the lookup-table (LUT) 105. An output pin of the LUT 105 can be coupled to pin D1.D of destination D1. Pin S2.Q of source S2, in addition to being coupled to the LUT 105, also can be coupled to pin D2.D of destination D2. An input/output (I/O) module 110 can be coupled to a clock enable (Ce) pin D2.Ce of destination D2.

Thus, source S1 has a data path to destination D1, denoted as S1-D1, which flows through the LUT 105. Source S2 also has a data path to destination D1, denoted as S2-D1, which flows through the LUT 105. Source S2 also has a data path flowing directly to destination D2, denoted as S2-D2. Source S3 has a data path to destination D1, denoted as S3-D1, which flows through the LUT 105.

Since destination D1 has multiple sources, e.g., S1, S2, and S3, the determination of whether destination D1 conforms to a timing constraint that is applicable to destination D1 would need to analyze the timing of each individual data path leading to destination D1. A setup record and a hold record can be specified for each pin pair that includes a data pin and a clock pin that is used to time the data pin for a given synchronous element of a digital circuit design.

In one embodiment, a setup adjustment and a hold adjustment for the pin pair D1.D and D1.Clk can be created, where pin D1.D is the data pin and pin D1.Clk is the clock pin that times pin D1.D. The setup adjustment and the hold adjustment can be determined by performing static timing analysis. The setup and hold adjustments can be applied to setup and hold records respectively for the pin pair D1.D-D1.Clk. Once the setup adjustment and the hold adjustment are determined, both can be applied to a Standard Delay Format (SDF) file associated with the circuit design 100. Subsequently, the updated SDF file can be used as the source of delay information when performing dynamic timing analysis of circuit design 100. Using the SDF file, updated with static timing analysis data, e.g., the setup adjustment and the hold adjustment, the results of a dynamic timing analysis will approach, or more closely track, those determined using static timing analysis.

Since pin D1.D has multiple sources, e.g., S1, S2, and S3, any timing constraints and/or adjustments must reflect the timing of each data path from one of the sources to pin D1.D. For example, individual setup and hold adjustments can be calculated for each of the data paths defined by pin pairs S1.Q-D1.D, S2.Q-D1.D, and S3.Q-D1.D. Each individual setup adjustment and hold adjustment for the data path can be recorded and associated with pin D1.D or the pin pair D1.D-D1.Clk, as the case may be. In another example, a single setup adjustment and a single hold adjustment for pin pair D1.D-D1.Clk can be specified as the maximum adjustments that are implemented for any data path leading to pin D1.D.

When the timing constraint for destination D1 is not met, it can be difficult to determine which one, or ones, of the data paths leading to destination D1 may be causing the timing violation. By comparison, a timing constraint covering destination D2, e.g., associated with the pin pair D2.D-D2.Clk, concerns only one data path. In that case, only the data path S2-D2 needs to be analyzed. If the timing constraint for destination D2 is not met, the responsible data path can be clearly identified.

It should be appreciated that the circuit design 100 is intended to be an example of a circuit having a synchronous destination pin, with multiple sources flowing to that node. As such, the particular configuration of circuit 100 is not intended to limit the embodiments disclosed herein in any way. The embodiments can be applied to any circuit design that includes a synchronous pin having multiple source pins.

Figure 2:
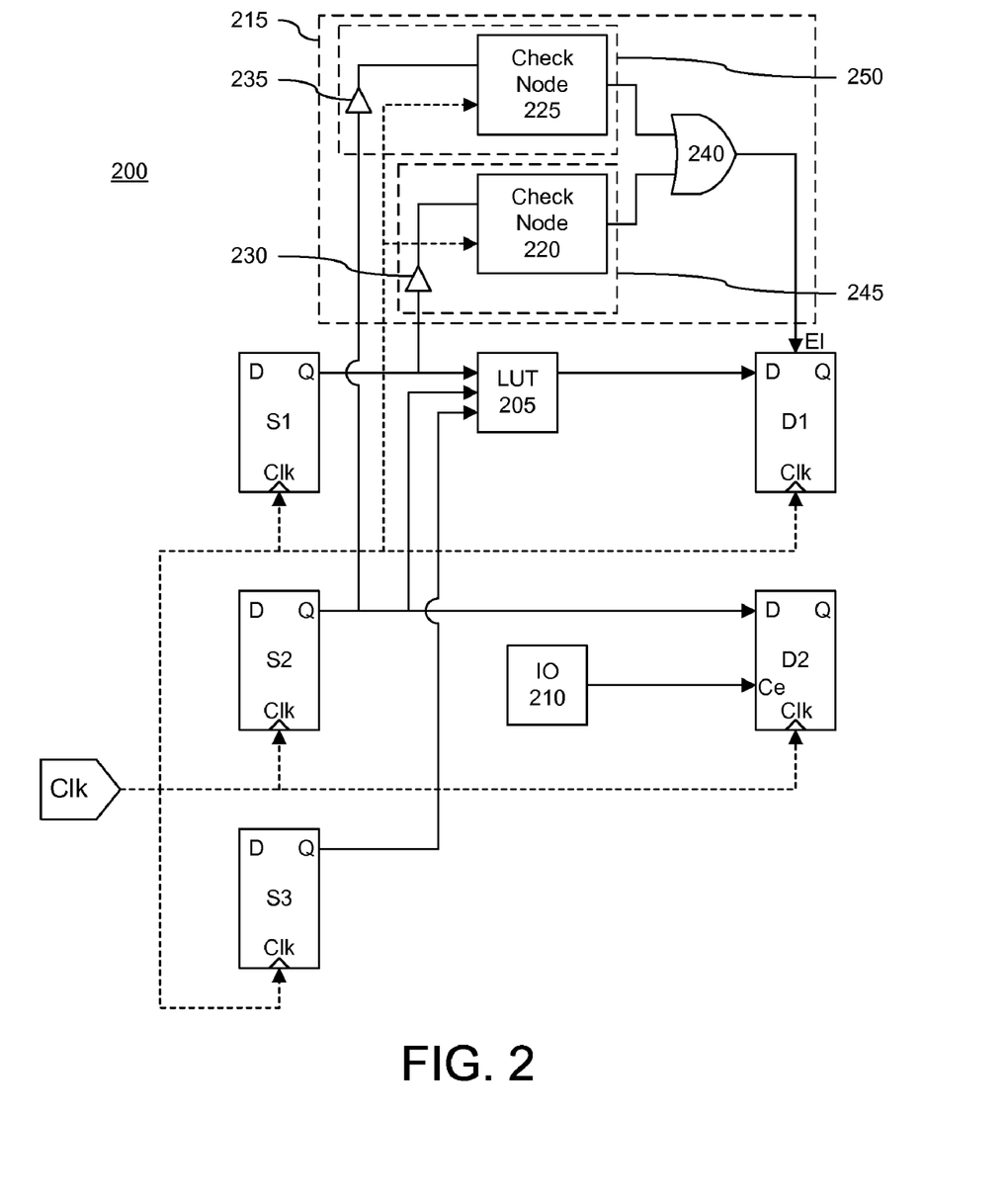
FIG. 2 is a second block diagram illustrating a circuit design in accordance with another embodiment of the present invention.

FIG. 2 is a second block diagram illustrating a circuit design 200 in accordance with another embodiment of the present invention. The circuit design 200 can be substantially similar to that illustrated in FIG. 1. For example, circuit design 200 can include sources S1, S2, S3, and destinations D1 and D2. Sources S1, S2, and S3 each can have a data path to destination D1 through a LUT 205. Source S2 also can have a data path to destination D2. An I/O 210 can be coupled to pin D2.Ce.

Based upon the size of the setup adjustment and the hold adjustment calculated for each data path leading to a particular destination, a simulation node 215 can be selectively inserted into the circuit design 200. More particularly, the slack of each data path leading to a selected destination, e.g., D1, can be calculated. For each data path, the slack of the longest path to the destination can be compared with the setup adjustment of the data path. Similarly, for each data path, the slack of the shortest path to the destination can be compared with the hold adjustment for the data path. When the hold adjustment or the setup adjustment of any data path leading to the destination is larger than the slack, a simulation node 215 can be inserted. The comparison can be performed for each data path leading to a selected destination, in this case destination D1.

In the pictured embodiment, at most one simulation node 215 is inserted for each destination pin. Within simulation node 215, however, one or more check node modules can be included. A check node module, as used herein, can include a check node and a buffer. As shown, check node module 245 can include a check node 220 and a corresponding buffer 230. Check node module 250 can include a check node 225 and a corresponding buffer 235.

As is well known, the term "slack" refers to the difference between the target delay of a data path and the determined path delay. In general, the target delay is a design constraint or goal, whereas the determined delay is an estimate of the actual delay as calculated by a circuit design and/or simulation tool. The slack for a given data path can be determined by subtracting the path delay of a data path from the target delay of the data path. A slack of zero indicates that the estimated path delay for the data path is equivalent to the target delay. A positive slack indicates that the path delay for the data path is smaller than the target delay, thereby meeting and exceeding the timing requirements. A slack that is less than zero indicates a data path having a path delay greater than the target delay.

Accordingly, the slack of data paths leading to a same destination can be determined and compared with timing adjustments recorded for each respective data path. Based upon the comparisons, check node modules may be selectively included within the circuit design. The check node of the check node module performs a setup check, a hold check, or both for a given data path to detect any timing violations.

The setup timing interval and the hold timing interval, used for setup and hold checks respectively, can be adjusted, or defined, according to the adjustments determined through static timing analysis.

The comparison of slacks and adjustments is performed for each data path leading to the destination register or pin being analyzed. Thus, a check node module may or may not be inserted for a given data path depending upon whether the relevant adjustment, e.g., setup or hold, exceeds the measure of slack. Referring to destination D1, for example, simulation node 215 can include up to a total of three check node modules, where each data path to the destination can include one check node module that can perform a setup check, a hold check, or both. Each check node module can have a buffer coupled directly to the input of the check node as shown and to be described herein in greater detail.

For example, consider the case where the setup adjustment of data path S1-D1 is determined to be larger than the slack of the data path to D1 having the longest delay, e.g., data path S3-D1. In that case, check node module 245 including check node 220 can be inserted into the circuit design 200 within the simulation node 215 as shown. Check node module 245 can be inserted in parallel with the LUT 205 such that a data path extending from pin S1.Q to an input of the buffer 230, from the output of the buffer 230 to an input of the check node 220, from the output of the check node 220 to pin D1.EI is created. Check node 220 and buffer 230, in general, are parallel to the data path S1-D1 in that both begin at source S1 and end at destination D1. A logical OR gate 240 may be included depending upon the number of check node modules included within simulation node 215. Pin D1.EI can be included within, or added to, destination D1 as an error input pin.

The buffer 230 can be created and assigned a maximum delay setting that reflects the maximum delay of the signal from S1 to D1, e.g., the maximum time that may be required for a signal to propagate from pin S1.Q through LUT 205, to pin D1.D. Thus, for purposes of performing a setup check, the buffer 230 will delay the signal from pin S1.Q to the input of check node 220 by the maximum delay that is calculated for data path S1-D1. By comparison, the check nodes, e.g., check nodes 220 and 225, as well as the logical OR gate 240, can be assigned a zero delay.

A similar analysis can be performed with respect to hold times. For example, consider the case where the hold timing adjustment of data path S1-D1 exceeds the slack of the shortest path to destination D1, e.g., the slack of path S1-D1. In that case, check node 220 can be augmented with a hold check. A delay reflecting the minimum delay of data path S1-D1 can be added to the timing data for buffer 230. That is, the minimum delay of buffer 230 will be the time required for a signal to propagate from pin S1.Q through LUT 205 to pin D1.D.

Accordingly, check node 220 can include the necessary programming to perform a setup check and a hold check during dynamic timing analysis. For the setup check, the timing interval can be determined according to the setup adjustment that has been determined for data path S1-D1 through static timing analysis. Check node 220 can compare the arrival time of the data signal from buffer 230, using the maximum time for buffer 230, with the timing interval that has been modified according to the setup adjustment for path S1-D1. If the arrival of the data signal is not within the adjusted timing interval, as determined with reference to the clock signal, check node 220 can output an error signal, indicative of a setup violation, that can be provided to pin D1.EI.

For the hold check, the timing interval can be determined according to the hold adjustment that has been determined for data path S1-D1 through static timing analysis. Check node 220 can compare the signal received from buffer 230, using the minimum delay of buffer 230, with the adjusted timing window using the clock signal as a reference. If the data signal is not stable within the adjusted timing interval, an error signal can be output from check node 220, which can be provided to pin D1.EI. The error signal can indicate a hold violation.

Turning to data path S2-D1, consider the case in which that data path has a hold timing adjustment that exceeds the slack of the data path having the shortest delay. In this case, check node module 250, including check node 225 and buffer 235, can be inserted within the simulation node 215 as shown. The check node 225 can be clocked with the clock signal. Buffer 235 can be assigned a delay that is equivalent to a minimum delay of path S2-D1. That is, buffer 235 can delay the signal taken from pin S2.Q by an amount that is equivalent to the minimum delay for a signal to propagate from pin S2.Q through LUT 205, to pin D1.D. The path created through insertion of check node module 250 can begin at pin S2.Q, continue to an input of buffer 235, continue from an output of buffer 235 to an input of check node 225, and continue from an output of check node 225 optionally through the logical OR 240 to pin D1.EI. The path created is generally parallel to data path S2-D1. That is, both begin at source S2 and terminate at destination D1.

For purposes of illustration, it can be assumed that data path S2-D1 does not qualify for a setup check. Check node 225 can be programmed to perform a hold check during dynamic timing analysis to determine whether signals are received from buffer 235 within the proper timing interval. The timing interval can be determined according to the hold adjustment that has been determined for data path S2-D1 through static timing analysis. Check node 225 can compare the arrival time of the data signal through buffer 235, using the minimum delay of buffer 235, with the timing interval that has been modified according to the hold adjustment for path S2-D1. If the arrival of the data signal is not within the adjusted interval, as determined with respect to the clock signal, check node 225 can output an error signal that is provided to pin D1.EI.

It should be appreciated that inclusion of the logical OR gate 240 within the simulation node 215 is only needed in cases where more than one check node module is inserted for a selected destination. That is, the logical OR gate 240 will output an error signal to pin D1.EI responsive to receiving an error signal from any check node having an output directly coupled to an input of the logical OR gate 240. For example, when a single check node module is inserted, no error signals need to be mixed to be provided to pin D1.EI of destination D1. In that case, an output pin of the check node can be directly coupled to pin D1.EI. When more than one check node module is included, the logical OR gate 240 is included to pass an error signal any time that one of the data paths leading to destination D1 misses a timing constraint.

The simulation node 215, inclusive of any buffers, check nodes, and OR gates, can be included within a circuit design that is to be simulated, e.g., a simulation netlist. As such, each can be represented as a software construct that is added to a circuit design, e.g., a programmatic description of a circuit design that can be simulated. When the adjustment for a data path exceeds the slack, the adjustment can cause the data path to become critical. Insertion of simulation node 215 provides a mechanism for determining the particular data path, for a multi-sourced destination, that is the cause of a missed timing constraint. The delay that is modeled from the data path for which the check node module is included can be completely specified by the buffer. As noted, the check nodes and the logical OR gate, if included, can be assigned a zero delay so as not to skew any delay calculations and delays represented or modeled by the buffers.

In another embodiment, destination D1 can be configured to output an "unknown" logical value as opposed to a logical one or zero. For example, during dynamic timing analysis, destination D1 can output the unknown value responsive to detecting an error signal on pin D1.EI. Similarly, during dynamic timing analysis, each check node can output, or log, an error message responsive to detecting a setup or hold violation. The error message can indicate the type of violation detected (e.g., setup or hold) and the particular source that was responsible for causing the timing violation.

FIG. 2 has been presented for purposes of illustration only. It should be appreciated that depending upon the timing analysis described, each data path may or may not include a check node/buffer combination. With respect to the exemplary embodiments depicted in FIG. 2, it should be appreciated that data path S3-D1 was presumed have no need for a check node.

Figure 3A:
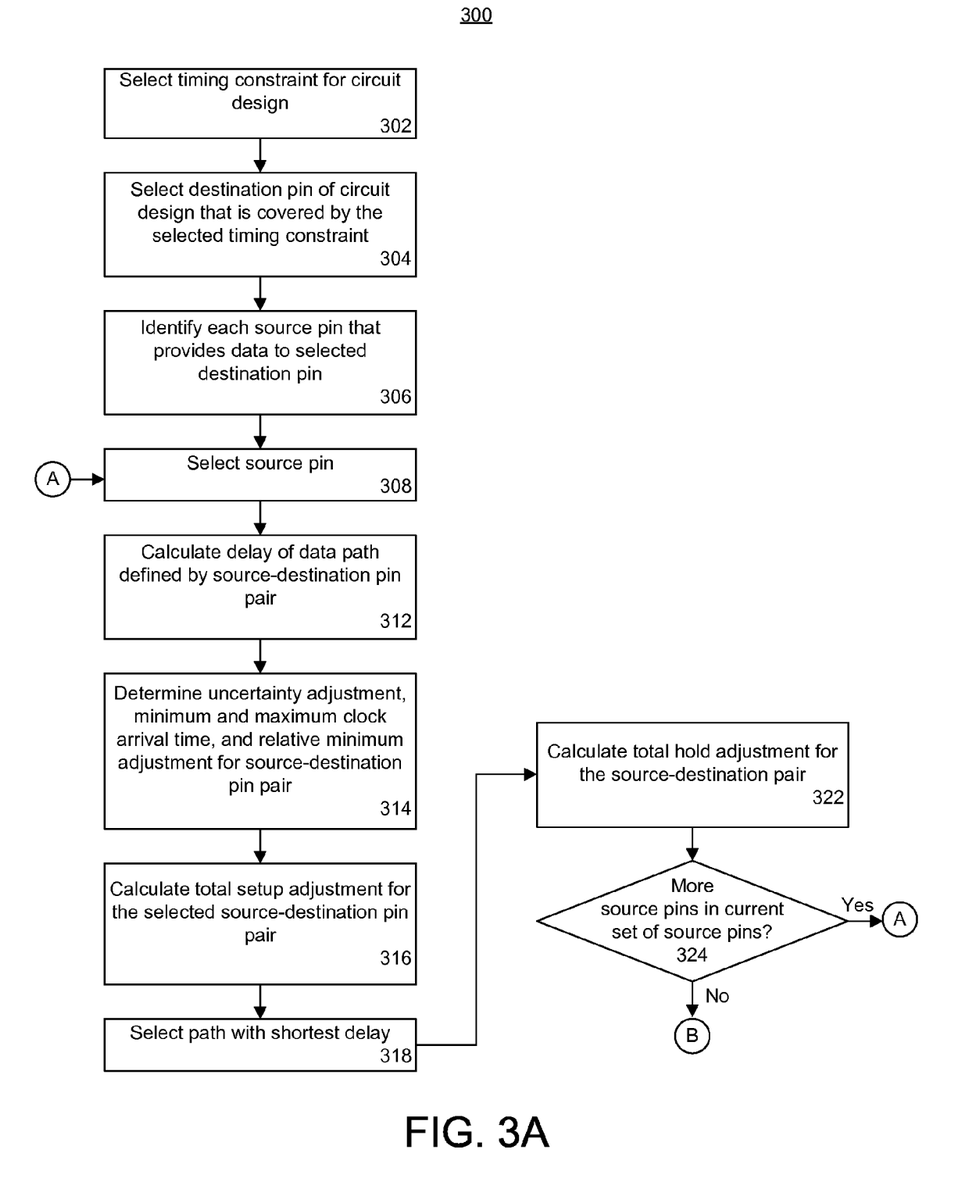
FIGS. 3A and 3B, taken collectively, form a flow chart illustrating a method of timing analysis in accordance with another embodiment of the present invention.
Figure 3B:
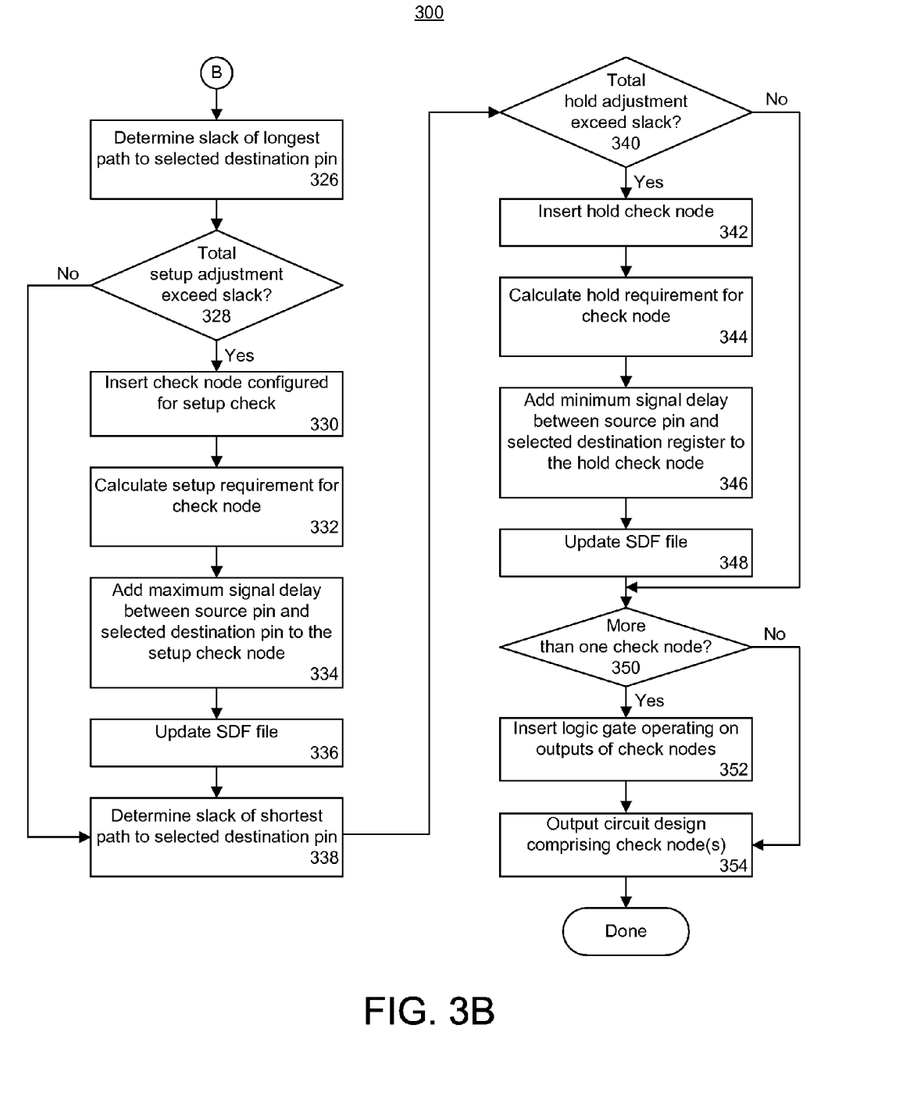

FIGS. 3A and 3B, taken collectively, form a flow chart illustrating a method 300 of timing analysis in accordance with another embodiment of the present invention. The method 300 illustrates the various delay calculations and processing steps that may be performed in creating simulation nodes as illustrated with respect to FIGS. 1 and 2. Accordingly, the method 300 can be performed using an EDA tool executing within a data processing system, for example. The EDA tool can perform static timing analysis and the various other operations described herein.

The method 300 can begin in a state in which a circuit design, e.g., a simulation netlist, has been identified and/or otherwise loaded into the EDA tool. The circuit design can include, or be associated with, one or more timing constraints that also are available to the EDA tool. Accordingly, in step 302 of FIG. 3A, a timing constraint for the circuit design can be selected. In step 304, a destination pin of the circuit design that is covered by the selected timing constraint can be selected. In step 306, each source pin that provides data to the selected destination pin can be identified. In step 308, one of the source pins identified in step 306 can be selected for processing.

Beginning in step 312, the EDA tool can begin performing the necessary calculations for determining the total setup adjustment for the current source-destination pin pair. In step 312, a delay for the data path defined by the selected source-destination pin pair can be determined. The delay can be determined using static timing analysis. In the event that the data path includes recombinant logic, e.g., where the data path splits down two or more independent signal paths of combinatorial logic that rejoin at or before the destination pin, the delay of each such data path can be calculated. In that case, the particular data path having the longest delay can be selected as the data path and as the delay for the data path defined by the selected source-destination pin pair.

In step 314, an uncertainty adjustment, a minimum clock arrival time, a maximum clock arrival time, and a relative minimum adjustment for the current source-destination pin pair can be calculated. The uncertainty adjustment for the source pin can be set equal to the clock uncertainty between the source and destination clocks that clock the source-destination data path. The maximum clock arrival time can be set equal to the maximum clock arrival time for path clock pins used in skew calculations. The minimum clock arrival time can be set equal to the minimum clock arrival time for clock pins used in skew calculations. Accordingly, the maximum and minimum clock arrival times can be set equal to the destination clock maximum and minimum clock arrival times respectively at the clock pin controlling the destination pin. The relative minimum adjustment can be set equal to the difference between the maximum and minimum clock arrival times.

Clock uncertainty, as used herein, can be viewed as the sum of one or more different delay quantities that arise from any of a variety of different sources. For example, jitter can be a significant cause of clock uncertainty. Jitter can arise from noise and/or crosstalk on the clock distribution network on the target device, jitter inherent in an external clock source provided to the target device, discrete jitter from clock generation circuitry, e.g., from a multiplexer or phase lock loop, as well as phase error and/or duty cycle error.

In step 316, a total setup adjustment for the current source-destination pin pair can be calculated. In one embodiment, the total setup adjustment for the current source pin can be determined by adding the uncertainty adjustment and the relative minimum adjustment that were calculated in step 314. The total setup adjustment for the current source-destination pin pair can be used to adjust the setup record for the current source-destination pin pair. For example, the total setup adjustment can be added to the delay determined in step 312.

In step 318, the EDA tool can begin performing the necessary calculations for determining the total hold adjustment for the current source-destination pin pair. In step 318, the path with the shortest delay can be selected. If the data path defined by the current source-destination pin pair includes no recombinant logic, the delay used in step 312 can be used or selected in step 318. If, however, the data path includes recombinant logic, the data path having the shortest delay can be selected as the delay in step 318.

In step 322, a total hold adjustment for the current source-destination pin pair can be calculated. In one embodiment, the total hold adjustment for the current source pin can be determined by adding the uncertainty adjustment and the relative minimum adjustment that were calculated in step 314. The total hold adjustment for the current source-destination pin pair can be used to adjust the hold record for the current source-destination pin pair. It should be appreciated that the hold record used can be the delay determined for the shortest delay path discussed in relation to step 318 for purposes of dynamic simulation. That is, the delay determined in step 318 can be adjusted by adding the total hold adjustment for the current source-destination pin pair.

In step 324, a determination can be made as to whether further source pins in the current set of source pins remain to be processed. That is, the EDA tool can determine whether more source pins of the selected destination pin remain to be processed. If more source pins remain to be processed, the method can loop back to step 308 to continue processing. If no further source pins remain to be processed, the method can continue to step 326 in FIG. 3B.

In step 326, the EDA tool can begin selectively inserting check nodes into the circuit design for the current source-destination pin pair. In step 326, the slack of the path to the destination pin having the longest delay can be determined. In step 328, a determination can be made as to whether the total setup adjustment for any of the source pins of the selected destination pin exceeds the slack of the path having the longest path delay. If the setup adjustment of any of the source pins for the selected destination pins exceeds the slack, the method can proceed to step 330. If not, the method can continue to step 338.

In step 330, a check node can be inserted into the circuit design for each data path to the selected destination pin that has a total setup adjustment exceeding the slack of the longest delay path. That is, a check node construct can be inserted into the simulation netlist for each data path to the selected destination pin that has a total setup adjustment exceeding the slack of the longest delay path. The check node can be configured to perform a setup check for the particular source-destination pin pair for which the check node is inserted.

In step 332, a setup requirement for each check node can be calculated. For each source-destination pin pair for which a check node is inserted, the setup requirement can be calculated using the delay determined for the longest path (e.g., from step 312) as adjusted using the total setup adjustment for that source-destination pin pair. Each setup requirement can be applied to a respective, e.g., associated, check node construct.

For each check node configured to perform a setup check, the check node requirement can be calculated as the sum of the setup requirement of the selected destination pin, e.g., the longest path delay, and the total setup adjustment for the source pin providing signal to that check node. For example, the timing window checked for a given setup check by a check node can be defined according to the setup requirement of the destination pin as modified through addition of the total setup adjustment for the source pin providing signal to the check node.

In step 334, the maximum signal delay for each source-destination pin pair can be added in the form of a maximum delay for a buffer that is inserted at the input of each respective check node. Each buffer, e.g., a buffer construct with corresponding timing characteristics as described herein, can be inserted into the simulation netlist at the input of each respective check node. In step 336, appropriate setup records of the SDF file for the circuit design can be updated with the adjusted setup information for each respective source-destination pin pair and the check node modules, e.g., the buffers, that have been inserted into the simulation netlist.

In step 338, the slack of the shortest path to the destination pin can be determined. In step 340, a determination can be made as to whether the total hold adjustment for any of the source pins of the selected destination pin exceeds the slack of the path having the shortest path delay. If the hold adjustment of any of the source pins for the selected destination pins exceeds the slack, the method can proceed to step 342. If not, the method can continue to step 350.

In step 342, a check node, e.g., a check node construct, can be inserted into the circuit design for each data path to the selected destination pin that has a total hold adjustment exceeding the slack. The check node can be configured to perform a hold check for the particular source-destination pin pair for which the check node is inserted. It should be appreciated that for those source-destination pin pairs for which a check node has already been inserted, a second check node need not be included. Rather, the existing check node can be augmented to include the hold check as well as the setup check.

In step 344, a hold requirement for each check node can be calculated. For each source-destination pin pair for which a check node is inserted as a result of step 340, the hold requirement can be calculated using the delay determined for the shortest path (e.g., from step 318) as adjusted using the total hold adjustment for that source-destination pin pair. Each hold requirement can be applied to a respective, e.g., associated, check node construct.

For each check node performing a hold check, the hold check can be calculated as the sum of the hold requirement of the selected destination pin, e.g., the shortest path delay, and the total hold adjustment for the source pin providing signal to that check node. For example, the timing window checked for a given check node can be defined according to the hold requirement of the destination pin as modified through the addition of the total hold adjustment for the source pin providing signal to the check node.

In step 346, the minimum signal delay for each source-destination pin pair can be added in the form of a minimum delay for a buffer, e.g., a buffer construct, that is inserted at the input of each respective check node. If a buffer has already been inserted for a given source-destination pin pair, the existing buffer can be augmented with timing data specifying the minimum delay. In step 348, appropriate hold records of the SDF file for the circuit design can be updated with the adjusted hold information for each respective source-destination pin pair.

In step 350, the EDA tool can determine whether more than one check node has been included for the current destination pin, e.g., whether the simulation node includes more than one check node. If so, the method can proceed to step 352. If not, the method can continue to step 354. In step 352, a logic gate can be inserted which can receive an output signal from each check node inserted into the simulation netlist for the source-destination pin pair. The output of the logic gate can be directly coupled to the error input pin of the destination. In other words, a logic gate can be inserted into the circuit design that mixes the outputs of each check node of the selected destination pin and provides the result as an error signal to an error input of the destination register that includes the selected destination pin.

In step 354, the resulting circuit design, e.g., the simulation netlist, can be output which specifies a simulation node, including any check node/buffer pairs that have been inserted into the circuit design. It should be appreciated that the updated SDF file also can be output. As used herein, "outputting" and/or "output" can mean, for example, writing to a file or memory, writing to a user display or other output device, sending or transmitting to another system, exporting, or the like.

It should be appreciated that the method described with reference to FIGS. 3A and 3B can be repeated as necessary to process additional destination pins having multiple sources. The circuit design output in step 354 can be used to perform dynamic timing analysis. The inclusion of the check nodes provides a mechanism that indicates which source of a plurality of sources for a given destination pin may be causing a timing violation. The dynamic timing analysis performed on the circuit design will be more accurate as the timing data used reflects modifications or adjustments determined through the use of static timing analysis.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a data processing system, e.g., a general-purpose computer system, with a computer program that, when being loaded and executed, controls the data processing system such that it carries out the methods described herein.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A computer-implemented method of performing timing analysis upon a circuit design comprising synchronous circuit elements, the method comprising:
selecting a destination pin having a plurality of source pins, wherein each source pin of the plurality of source pins defines a data path to the destination pin;
determining a slack of a selected data path of the data paths to the destination pin;
comparing, via a computer, a timing adjustment of each of the plurality of source pins to the slack of the selected data path, wherein each timing adjustment is determined using static timing analysis;
via the computer, selectively including, within the circuit design, a simulation node configured to perform at least one of a setup check or a hold check according to the comparison;
wherein the simulation node includes a check node and a buffer coupled between one of the source pins and an input of the check node, and the check node is configured to determine whether or not a timing violation occurs for a signal output from the buffer according to a timing interval defined, at least in part, by the timing adjustment for the path defined by the one of the source pins; and
outputting, via the computer, the circuit design comprising the simulation node.

2. The computer-implemented method of claim 1, further comprising:
performing dynamic timing analysis upon the circuit design; and
outputting, from the simulation node, an error signal when a signal received by the simulation node from a given source pin is not received within a timing interval defined, at least in part, according to the timing adjustment of the given source pin,
wherein the error signal is independent of each data path defined by the plurality of source pins to the destination pin.

3. The computer-implemented method of claim 2, further comprising placing a destination register, comprising the destination pin, in an unknown state responsive to the error signal.

4. The computer-implemented method of claim 1, further comprising:
during dynamic timing analysis of the circuit design, the simulation node determining whether a timing violation has occurred according to a timing interval that depends, at least in part, upon at least one timing adjustment; and
responsive to determining that a timing violation has occurred, outputting an indication of the source pin responsible for the timing violation.

5. The computer-implemented method of claim 1, wherein the timing adjustments are setup adjustments and the selected path is a data path to the destination pin having a longest delay, and wherein the comparing comprises determining whether the setup adjustment for each source pin exceeds the slack of the selected path.

6. The computer-implemented method of claim 5, wherein selectively including the simulation node comprises, for each source pin having a setup adjustment exceeding the slack:
- including, within the circuit design, a buffer configured to receive a signal from the source pin, wherein the delay of the buffer is equivalent to a maximum delay of the data path defined by the source pin; and
- including, within the circuit design, a check node configured to receive a signal output from the buffer, wherein the check node is further configured to perform a setup check on the signal output from the buffer according to a timing interval defined, at least in part, by the setup adjustment for the path defined by the source pin.

7. The computer-implemented method of claim 6, further comprising coupling an output of the check node to an error input of a destination circuit element comprising the destination pin.

8. The computer-implemented method of claim 1, wherein the timing adjustments are hold adjustments and the selected path is a data path to the destination pin having a shortest delay, and wherein the comparing comprises determining whether the hold adjustment for each source pin exceeds the slack of the selected path.

9. The computer-implemented method of claim 8, wherein selectively including a simulation node comprises, for each source pin having a hold adjustment exceeding the slack:
- including, within the circuit design, a buffer receiving a signal from the source pin, wherein the delay of the buffer is equivalent to a minimum delay of the data path defined by the source pin; and
- including, within the circuit design, a check node configured to receive a signal output from the buffer, wherein the check node is further configured to perform a hold check on the signal output from the buffer according to a timing interval defined, at least in part, by the hold adjustment for the path defined by the source pin.

10. The computer-implemented method of claim 9, further comprising coupling an output of the check node to an error input of a destination circuit element comprising the destination pin.

11. The computer implemented method of claim 1, wherein selectively including the simulation node comprises:
- including a plurality of check nodes and corresponding buffers for the plurality of source pins; and
- including a logic gate, wherein an output of each check node is coupled to an input of the logic gate and the logic gate is configured to generate an error signal responsive to detecting an error signal from any of the plurality of check nodes, and wherein the error signal from the logic gate is coupled to an error input of a circuit element comprising the destination pin.

12. A computer-implemented method of performing timing analysis upon a circuit design comprising synchronous circuit elements, the method comprising:
- selecting a destination pin receiving a plurality of data paths;
- determining a slack of a data path having a longest delay of the plurality of data paths and a slack of a data path having a shortest delay of the plurality of data paths;
- calculating a setup adjustment and a hold adjustment for each of the plurality of data paths;
- comparing, via a computer, the setup adjustment of each data path with the slack of the data path having the longest delay;
- comparing, via the computer, the hold adjustment of each data path with the slack of the data path having the shortest delay;
- via the computer, for each data path, selectively including, within the circuit design, a check node according to the comparisons of the setup adjustment for the data path and the hold adjustment for the data path;
- wherein the check node is configured perform at least one of a setup check or a hold check according to the comparison and further output an error signal independent of the plurality of data paths when the at least one of the setup check or the hold check is failed; and
- outputting, via the computer, the circuit design comprising the check node.

13. The computer-implemented method of claim 12, further comprising:
- determining the setup adjustments and the hold adjustments through static timing analysis; and
- performing dynamic timing analysis upon the circuit design, wherein each check node compares signal timing according to a timing interval adjusted by at least one of the setup adjustment or the hold adjustment for the data path corresponding to the check node.

14. A computer program product, comprising:
- a non-transitory computer-usable medium having stored thereon computer-usable program code that, when executed by a computer, performs timing analysis upon a circuit design comprising synchronous circuit elements, the computer-usable medium comprising:
- computer-usable program code that selects a destination pin having a plurality of source pins, wherein each source pin of the plurality of source pins defines a data path to the destination pin;
- computer-usable program code that determines a slack of a selected data path of the data paths to the destination pin;
- computer-usable program code that compares a timing adjustment of each of the plurality of source pins to the slack of the selected data path, wherein each timing adjustment is determined using static timing analysis;
- computer-usable program code that selectively includes, within the circuit design, a simulation node configured to perform at least one of a setup check or a hold check according to the comparison;
- wherein the simulation node includes a check node and a buffer coupled between one of the source pins and an input of the check node, and the check node is configured to determine whether or not a timing violation occurs for a signal output from the buffer according to a timing interval defined, at least in part, by the timing adjustment for the path defined by the one of the source pins; and
- computer-usable program code that outputs the circuit design comprising the simulation node.

15. The computer program product of claim 14, wherein the computer-usable medium further comprises:
- computer-usable program code that, during dynamic timing analysis of the circuit design, determines whether a timing violation occurs according to a timing interval that depends upon at least one timing adjustment; and
- computer-usable program code that, responsive to determining that a timing violation has occurred, outputs an indication of the source pin responsible for the timing violation.

16. The computer program product of claim 14, wherein the timing adjustments are setup adjustments and the selected path is a data path to the destination pin having a longest delay, and wherein the computer-usable program code that compares comprises computer-usable program code that determines whether the setup adjustment for each source pin exceeds the slack of the selected path.

17. The computer program product of claim 16, wherein the computer-program code that selectively includes the simulation node comprises computer-usable program code that, for each source pin having a setup adjustment exceeding the slack:
- includes, within the circuit design, a buffer configured to receive a signal from the source pin, wherein the delay of the buffer is equivalent to a maximum delay of the data path defined by the source pin;
- includes, within the circuit design, a check node configured to receive a signal output from the buffer, wherein the check node is further configured to perform a setup check on the signal output from the buffer according to a timing interval defined, at least in part, by the setup adjustment for the path defined by the source pin; and
- couples an output of the check node to an error input of a destination circuit element comprising the destination pin.

18. The computer program product of claim 14, wherein the timing adjustments are hold adjustments and the selected path is a data path to the destination pin having a shortest delay, and wherein the computer-usable program code that compares comprises computer-usable program code that determines whether the hold adjustment for each source pin exceeds the slack of the selected path.

19. The computer program product of claim 18, wherein the computer-usable program code that selectively includes a simulation node comprises computer-usable program code that, for each source pin having a hold adjustment exceeding the slack:
- includes, within the circuit design, a buffer configured to receive a signal from the source pin, wherein the delay of the buffer is equivalent to a minimum delay of the data path defined by the source pin;
- includes, within the circuit design, a check node configured to receive a signal output from the buffer, wherein the check node is further configured to perform a hold check on the signal output from the buffer according to a timing interval defined, at least in part, by the hold adjustment for the path defined by the source pin; and
- couples an output of the check node to an error input of a destination circuit element comprising the destination pin.

20. The computer program product of claim 14, wherein the computer-usable program code that selectively includes a simulation node comprises:
- computer-usable program code that includes a plurality of check nodes and corresponding buffers for the plurality of source pins; and
- computer-usable program code that includes a logic gate, wherein an output of each check node is coupled to an input of the logic gate and the logic gate is configured to generate an error signal responsive to detecting an error signal from any of the plurality of check nodes, and wherein the error signal from the logic gate is coupled to an error input of a circuit element comprising the destination pin.

* * * * *